United States Patent [11] 3,523,529

[72] Inventor Abbott T. Kissen
 Dayton, Ohio
[21] Appl. No. 739,676
[22] Filed June 25, 1968
[45] Patented Aug. 11, 1970
[73] Assignee The United States of America as
 represented by the Secretary of the Air
 Force

[54] OXYGEN CONSUMPTION COMPUTER
 3 Claims, 3 Drawing Figs.
[52] U.S. Cl. .................................................... 128/2.07
[51] Int. Cl. .................................................... A61b 5/00
[50] Field of Search ........................................ 128/2.07,
 2.08 Elec. Resp. Digest; 356/41; 128/2; 98/1.5;
 340/237, 421, Inq.; 23/254-256, Inq.

[56] References Cited
 UNITED STATES PATENTS
 3,082,761 3/1963 Engelder ...................... 128/2.07
 3,401,683 9/1968 Webb et al .................... 128/2.07
 3,403,678 10/1968 Bolie ............................ 128/2.07

*Primary Examiner*— Richard A. Gaudet
*Assistant Examiner*— John B. Mitchell
*Attorney*— Harry A. Herbert, Jr. and Robert Kern Duncan

ABSTRACT: A polarographic oxygen sensor is used to provide an electrical signal proportional to the change in the percentage of oxygen in the inhaled air to that in the exhaled air. A mass flowmeter provides an electrical signal proportional to the mass flow of expired air. The electrical product of these signals integrated over the specific time involved provides an electrical signal representative of the amount of oxygen consumed by the subject.

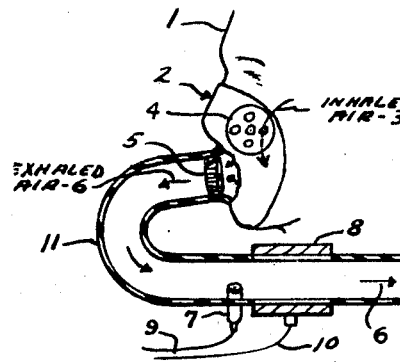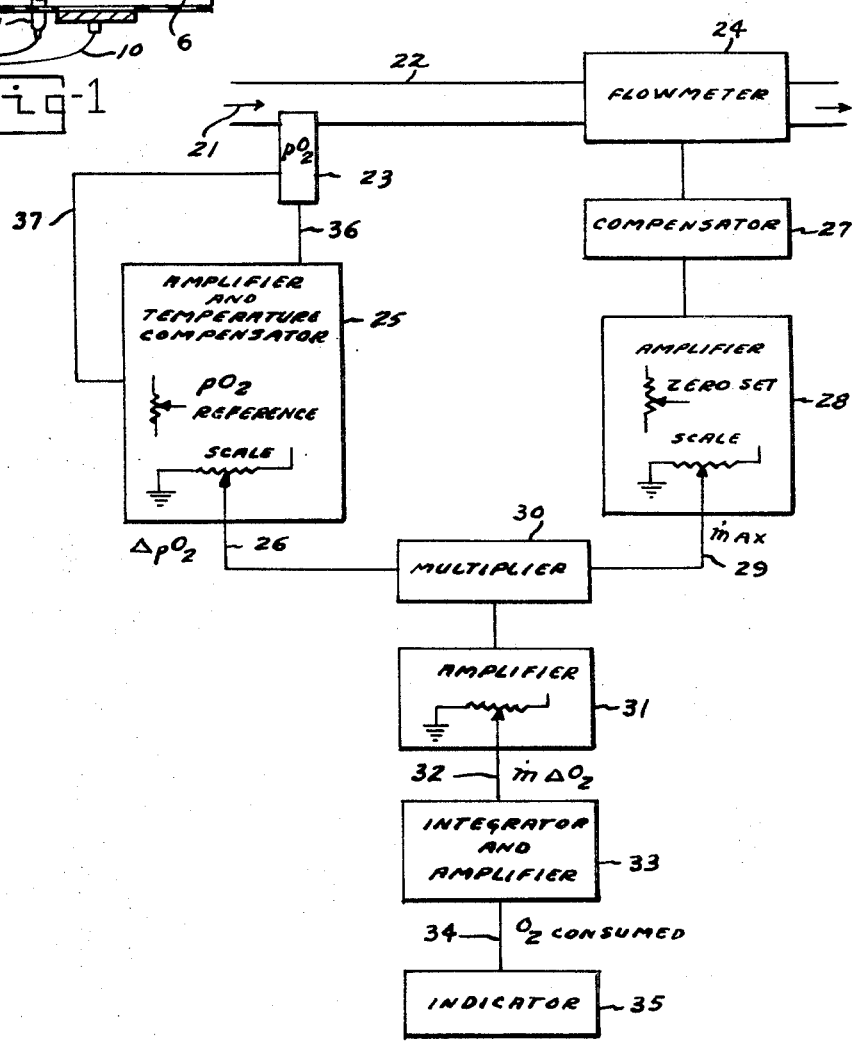

OXYGEN CONSUMPTION COMPUTER

BACKGROUND OF THE INVENTION

The field of this invention is in electrical physiological monitoring instruments.

In many instances, such as high altitude airplane flight, space flight, undersea living, and in the laboratory experimentation and testing in the development of related equipment, it is highly desirable to be able to monitor the amount of oxygen that a subject consumes under various physical conditions. Many systems and methods for determining subjective oxygen consumption are well known and in current use. For example, where continuous oxygen determinations are not required and skillful technical support is available, the Haldane, Scholander, or Van Slyke methods are extremely good. The sheer bulk and prohibitive cost of the mass spectrometer exclude its use even in many laboratories. The paramagnetic oxygen analyzer, the gas chromatograph, and the oxygen electrode techniques are disadvantaged by such limitations as large size, slow response time and calibration difficulties. The isolation and restrictive confinement of the subject in environmental simulators as well as programs involving environmental extremes usually preclude use of Douglas bags, spirometers, and related equipment.

SUMMARY OF THE INVENTION

This invention provides an electronic system whereby the on-line oxygen consumption of a subject is determined electronically. The system allows the subject virtually unrestrained mobility since the only attachment to monitoring equipment is electrical leads. It does require a face mask over the subject's nose and mouth or other means for isolating the exhaled air, such as a nose clamp and a mouthpiece equipped with one-way valves. It is a completely instrumented system and does not demand the technical support requirements of prior systems, hence the human errors associated with the conventional techniques are virtually eliminated. The compactness of the system makes it applicable to virtually all operational and experimental design situations including pressurized suits and restrictive environmental situations such as pressure chambers and underwater enviroments.

BRIEF DESCRIPTION OF THE DRAWINGS

FIGURE 1 is a pictorial view of an embodiment of the subjective apparatus of the invention;

FIGURE 2 is a block diagram of an embodiment of the invention in which the percent of oxygen in the exhaled breath is measured with respect to a predetermined oxygen percentage value.

DESCRIPTION OF THE PREFERRED EMBODIMENTS

Figure 3:
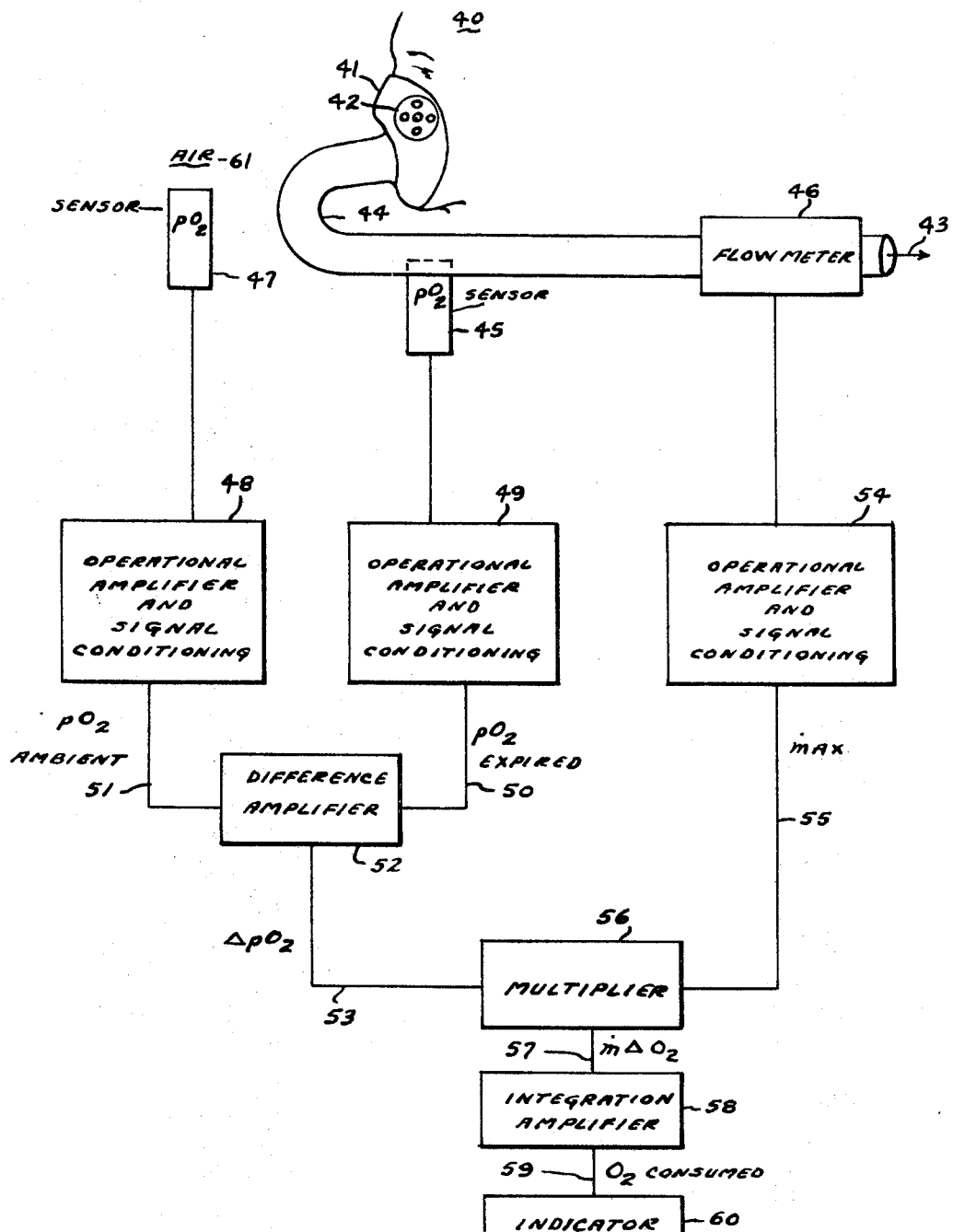
FIGURE 3 is a block diagram of an embodiment of the invention in which the percentage of oxygen in the exhaled breath is continuously compared with the percentage of oxygen in the ambient atmosphere.

FIGURE 1 is a pictorial view of an embodiment of the subjective apparatus used to measure the oxygen consumption of a person. The subject 1 breathes through the conventional face mask 2 which covers his nose and mouth and isolates the exhaled air. It is desirable that the mask 2 be a relatively small volume mask. The ambient inhaled air 3 enters the mask through the one-way inlet valve 4. The exhaled air passes through the one-way outlet valve 5 into tube 11. The air then passes over the conventional polarographic oxygen (pO₂) sensor 7 and through the mass flowmeter 8. The exhaled air 6 then passes out of the system and diffuses into the ambient atmosphere, or in instances of closed environments it may be conducted outside the immediate environment of the subject. Polarographic oxygen sensors for measuring the percentage of oxygen present in a gas are well known in the art and are commercially available. Patent No. 3,071,530 discloses one embodiment of a polarographic oxygen sensor. Polarographic oxygen sensors are generally quite temperature dependent, hence most commercially available units have a thermistor temperature sensing element incorporated in the structure adjacent the oxygen sensing element so that it may be electrically placed in the feedback network of the associated amplifier and controls the gain of the amplifier to compensate for changes in the output current of the oxygen sensor with temperature. In this invention it is desirable that the oxygen sensing system be independent of the temperature changes in the environment in which it is used.

The mass flowmeter 8 measures the mass flow of the air (gas) passing through it. Mass flowmeters are commercially available. Generally a compensating circuit 27 (FIG. 2) (usually referred to as a signal conditioner) accompanies each unit so as to provide a voltage output that varies linearly with the mass flow of the gas. The voltage for the mass flow rate of the gas may be expressed: $E = K\rho V$ where E is the output voltage in volts, k is a constant, $\rho$ is the gas density, and V is the volume rate of gas flow. Patent No. 3,220,255 sets forth a mass flowmeter. It is to be observed that the mass flowmeter takes into consideration any changes in gas temperature and pressure as the operating gas density $\rho$ is a function of the gas pressure, gas temperature, and gas density at standard pressure and temperature as expressed, $\rho = p/14.7 \times 530/460+t \times \rho_s$, where $\rho$ is the gas density at operating pressure and temperature, $\rho_s$ is the gas density at standard pressure (14.7 psia) and temperature (70°F), t is the operating gas temperature, and P is the operating gas pressure.

In the embodiment of this invention shown in block diagram form in FIGURE 2, a reference value of the percentage of oxygen present in the ambient air is made before the subject places the mask on his face. This amounts to setting the reference calibration control in the conventional polarographic oxygen sensing amplifier 25 to provide a zero output on line 26 (with the scale control preferably set to maximum); any change then in the percentage of oxygen at the sensor will now appear as a voltage output on line 26. Also, prior to the subject's donning the mask, the output of the flowmeter 24 is zeroed for the no-flow condition by the zero set control in the conventional flowmeter amplifier 28. Generally, the amplifiers 25 and 28 have indicating voltmeters incorporated in them; if this is not the case, ordinary voltage indicating meters may be connected to lines 26 and 29 to perform these zero setting adjustments.

When the subject puts on the mask and starts breathing through it his exhaled air 21 flows through tube 22 and the percentage of oxygen at the polarographic oxygen sensor is decreased due to his consumption of oxygen. This amount of decrease, $\Delta pO_2$, appears as an output voltage on line 26. The subject's exhaled breath passes through the flowmeter 24 and a voltage is provided on line 29 proportional to the instantaneous mass flow of his expired air, $m_{ax}$. These voltages are multiplied by the conventional multiplier 30 and its output is amplified by amplifier 31. The amplifier output on line 32 is thus proportional to the instantaneous mass of oxygen consumed, $m\Delta O_2$. When this voltage is integrated over the specific time involved, that is, the length of time over which it is desired to measure the total oxygen consumed by the subject, an output voltage is provided on line 34 that is indicative of the total amount of oxygen consumed. The indicator 35 may be an indicating voltmeter, or, if a permanent record is desired, a conventional recording voltmeter which is usually calibrated to read the oxygen consumption in cubic centimeters. The integrator-amplifier 33 is a conventional commercially available voltage integrator. The function of the adjustable output controls on the oxygen sensor amplifier and the flowmeter amplifier are to scale the magnitudes of the voltage levels so that they may be made compatible to the multiplier. Likewise, the amplifier 31 has an adjustable level control to scale its output to the integrator and (indirectly) the indicator. These scaling and matching techniques are common practice and well known in the electronic art. Line 37 represents the connection to the thermistor element in the oxygen sensor to provide the temperature compensation correction in the amplifier.

The embodiment of FIGURE 2 will not take into effect any changes in the oxygen content of the ambient air after the subjective measurement has started. For many applications this is not important as the oxygen content of the ambient air in most instances will remain practically constant. However, in some instances the oxygen content of the air may be changing, or, instead of the subject breathing the normal atmosphere, a prepared mixture of gases may be supplied as the subject's ambient air in an enclosed environment. In these instances the embodiment of FIGURE 3 is preferred. In this embodiment, the oxygen content of the air 61 that the subject 40 breathes is continuously measured by polarographic oxygen sensor 47 and the voltage output from its associated amplifier 48 on line 51 is a direct measure of the polarographic oxygen content of the air (gas) that the subject inhales. Polarographic oxygen sensor 45 measures the oxygen content of the air that the subject exhales and the voltage output of its associated amplifier 49 on line 50 is a direct measure of the oxygen content in the subject's exhaled breath. These two polarographic oxygen measuring systems have identical calibration characteristics, that is, they provide equal voltage outputs for equivalent amounts (percentages) of oxygen. Both systems are either insensitive to temperature changes or temperature compensated as previously explained.

Conventional difference amplifier 52 provides an output on line 53 proportional to the difference in percentage of oxygen in the inhaled air and the exhaled air. This difference, $\Delta pO_2$, is multiplied in the voltage multiplier 56 by the mass flow of the expired air, $m_{ax}$, as determined by the flowmeter 46 and its associated amplification and conditioning circuitry 54. The product, $m\Delta O_2$, is integrated by integration amplifier 58, and the amount of oxygen consumed displaced by the indicator 60. Apart from the fact that the percentage of oxygen in the exhaled air is continuously measured against that of the inhaled air instead of against a determined reference, the embodiment of FIGURE 3 functions essentially like that of FIGURE 2.

The calibration of the system may be accomplished in many ways. The commercially available polarographic oxygen sensors are normally supplied with a calibration curve or characteristic relating their output directly to percentage of oxygen. Likewise the commercially available flowmeters are calibrated in output volts per pounds per minute or standard liters per minute. Thus the system may be calibrated mathematically, directly in the amount of oxygen consumed. Another way to calibrate the system is to pass the exhaled air into a conventional gasometer and analyze the air by gas chromatography in the conventional manner that the consumption of oxygen has previously been measured before this invention.

The correlation coefficient of the system herein disclosed and a conventional high quality gas chromatography laboratory system was made over the oxygen consumption values of 200 to 2400 cc of oxygen per minute for 31 different subjects. The coefficient was 0.993 with a 95 percent confidence interval 0.990, 0.995.

It is to be noted that the sequence of the arrangement of the $pO_2$ sensor and the flowmeter with respect to the exhaled air is not critical, that is, the exhaled air could pass through the flowmeter before passing over the oxygen sensor. Likewise the flowmeter could be placed on a tube on the inlet side of the mask. It has been found that for all practical purposes in these measurements, the mass of air inhaled is equal to that exhaled, (that is, the mass of oxygen removed by the subject is essentially replaced by an equivalent mass of carbon dioxide). It is desirable that the response time of the oxygen sensor and the flowmeter be relatively short so that essentially breath-by-breath analysis is had prior to integration.

I claim:

1. An oxygen consumption computing system for determining the amount of oxygen consumed over a specific period of time by a subject from the subject's inhaled and exhaled air, the said system comprising:
   (a) a first polarographic oxygen sensing means for determining the percentage of oxygen in the inhaled air;
   (b) a second polarographic oxygen sensing means for determining the percentage of oxygen in the exhaled air;
   (c) difference means cooperating with the said first polarographic oxygen sensing means and the second polarographic oxygen sensing means for providing the difference between the said percentages;
   (d) flowmeter means for determining the mass flow of the exhaled air;
   (e) multiplying means cooperating with the said difference means and the said flowmeter means for providing a product of the said difference and the said mass flow;
   (f) integrating means for integrating the said product over the siad specific period of time; and
   (g) indicating means cooperating with the said integrating means for indicating the amount of oxygen consumed.

2. An oxygen consumption computing system for determining the amount of oxygen consumed over a determined period of time by a subject from the ambient air inhaled by the subject and his exhaled air, the said system comprising:
   (a) a first polarographic oxygen sensing means having a voltage output proportional to the oxygen content of the said ambient air;
   (b) facial mask means for isolating the said exhaled air;
   (c) a second polarographic oxygen sensing means having a voltage output proportional to the oxygen content of the said exhaled air, and identical calibration with said first polarographic oxygen sensing means;
   (d) difference amplification means cooperating with the said voltage outputs of the first and the said second polarographic oxygen sensing means providing a voltage output proportional to the difference in the said voltage outputs;
   (e) flowmeter means for measuring the mass flow of the said exhaled air and providing a voltage output proportional to the mass flow;
   (f) electronic multiplier means cooperating with the said difference amplification means and the said flowmeter means providing a voltage output proportional to the product of the output voltage of the difference amplifier means and the output voltage of the flowmeter means;
   (g) electronic integration means for integrating the voltage output of the multiplier means over the said determined period of time and providing a voltage output proportionate to the said integral; and
   (h) indicating means responsive to the voltage output of the said integration means for providing an indication of the amount of oxygen consumed by the said subject over the said period of time.

3. A subjective oxygen consumption computing system for determining from the exhaled air of a subject the amount of oxygen consumed by the subject from ambient air of a known percentage of oxygen content, the said system comprising:
   (a) polarographic oxygen sensing means responsive to a subject's exhaled air for providing a voltage output proportional to the difference in the percentage of oxygen in the exhaled air and the said known percentage of oxygen content of the ambient air;
   (b) flowmeter means responsive to the said subject's exhaled air for providing a voltage output proportional to the mass flow of the said exhaled air;
   (c) multiplier means cooperating with the voltage output of the said oxygen sensing means and the said voltage output of the flowmeter means for providing a voltage output proportional to the product of the said output voltages;
   (d) means responsive to the said multiplier means for integrating the voltage output of the said multiplier means and providing a voltage output; and
   (e) means responsive to the voltage output of said integrating means for indicating the said voltage output.